United States Patent [19]
Phillips

[11] 3,820,185
[45] June 28, 1974

[54] BARBECUE GRILL CLEANING DEVICE

[76] Inventor: Carroll D. Phillips, 134 Cherry Brook Rd., Weston, Mass. 02193

[22] Filed: Jan. 4, 1973

[21] Appl. No.: 321,073

[52] U.S. Cl. ................................. 15/105, 15/236 R
[51] Int. Cl. ...................... A47j 37/07, A47l 17/00
[58] Field of Search ............ 15/236 R, 105, 104.04, 15/111, 143 R; 30/121.5, 171.172; 81/90 R, 90 D, 90 E, 9.5 C, 9.5 R; 29/81 G; 130/31 A; 7/14.2 R, 14.25, 14.6, 17; 128/304, 306, 309

[56] References Cited
UNITED STATES PATENTS

| | | | |
|---|---|---|---|
| 414,375 | 11/1889 | Chase | 15/238 |
| 828,996 | 8/1906 | Blackburn | 15/104.04 |
| 872,567 | 12/1907 | Langstaff | 15/111 |
| 1,145,966 | 7/1915 | Bergmann | 15/104.04 |
| 2,056,447 | 10/1936 | Fell | 15/143 R |
| 2,747,911 | 5/1956 | Kuever | 15/236 R |
| 2,807,814 | 10/1957 | Leeming | 15/111 |
| 2,824,323 | 2/1958 | Tos et al. | 15/105 |
| 2,920,517 | 1/1960 | Willey, Jr. | 81/90 E |
| 3,213,779 | 10/1965 | First | 99/352 |
| 3,366,987 | 2/1968 | Giustino | 15/236 R |
| 3,434,175 | 3/1969 | Bray | 15/236 R |
| 3,487,491 | 1/1970 | Dunn | 15/111 |

*Primary Examiner*—Leon G. Machlin
*Attorney, Agent, or Firm*—Sughrue, Rothwell, Mion, Zinn & Macpeak

[57] ABSTRACT

A device for cleaning barbecue grills comprising a blade having a slot therein adapted to engage the grill rods. The blade is preferably twisted to facilitate pivoting the slot about the grill rods to clean the under surfaces thereof, and the blade may have two slots, one on open slot at the tip thereof and one a closed slot set back from the tip, to enable cleaning of different sized grill rods. If the blade has two slots therein, the tip of the blade must be bent over just behind the scraping surface of the closed slot to permit engagement of the closed slot with the grill rods. In this case the closed slot is also preferably formed with an enlargement immediately behind the bend at the front of the slot, and the blade is preferably bent back near the opposite end of the closed slot.

7 Claims, 2 Drawing Figures

BARBECUE GRILL CLEANING DEVICE

BACKGROUND OF THE INVENTION

1. Field of the Invention

This invention is of a device for cleaning barbecue grills. More particularly, it is of a tool having a relatively rigid blade (as opposed, for instance, to a tool having a brush) which shears cooking deposits from the surface of the grill rods.

2. Description of the Prior Art

Various devices have been proposed or are now on the market for removing cooking deposits from the surface of the grill rods in barbecue grills. Most of these devices employ brushes, which are ineffective on hardened accumulations and do not address the back, or under, side of the grill. A few, such as those disclosed in U.S. Pat. Nos. 2,747,911 and 2,824,323, have rigid blades, but they are designed such that they are dependent upon a particular size of, and an equal spacing between, the grill rods.

SUMMARY OF THE INVENTION

The present invention is a simple hand tool which is a great deal simpler to fabricate and more flexible in use than the prior art, yet accomplishes the task of cleaning the grill rods with relative ease and great reliability. The hand tool comprises a blade and an insulating handle. The blade is preferably twisted to facilitate pivoting the slot about the grill rods to clean the under surfaces thereof, and the blade may have two slots, one an open slot at the tip thereof and one a closed slot set back from the tip, to enable cleaning of different sized grill rods. If the blade has two slots therein, the tip of the blade must be bent over just behind the scraping surface of the closed slot to permit engagement of the closed slot with the grill rods. In this case the closed slot is also preferably formed with an enlargement immediately behind the bend at the front of the slot, and the blade is preferably bent back near the opposite end of the closed slot.

DETAILED DESCRIPTION OF THE PREFERRED EMBODIMENTS

Figures 1, 2:
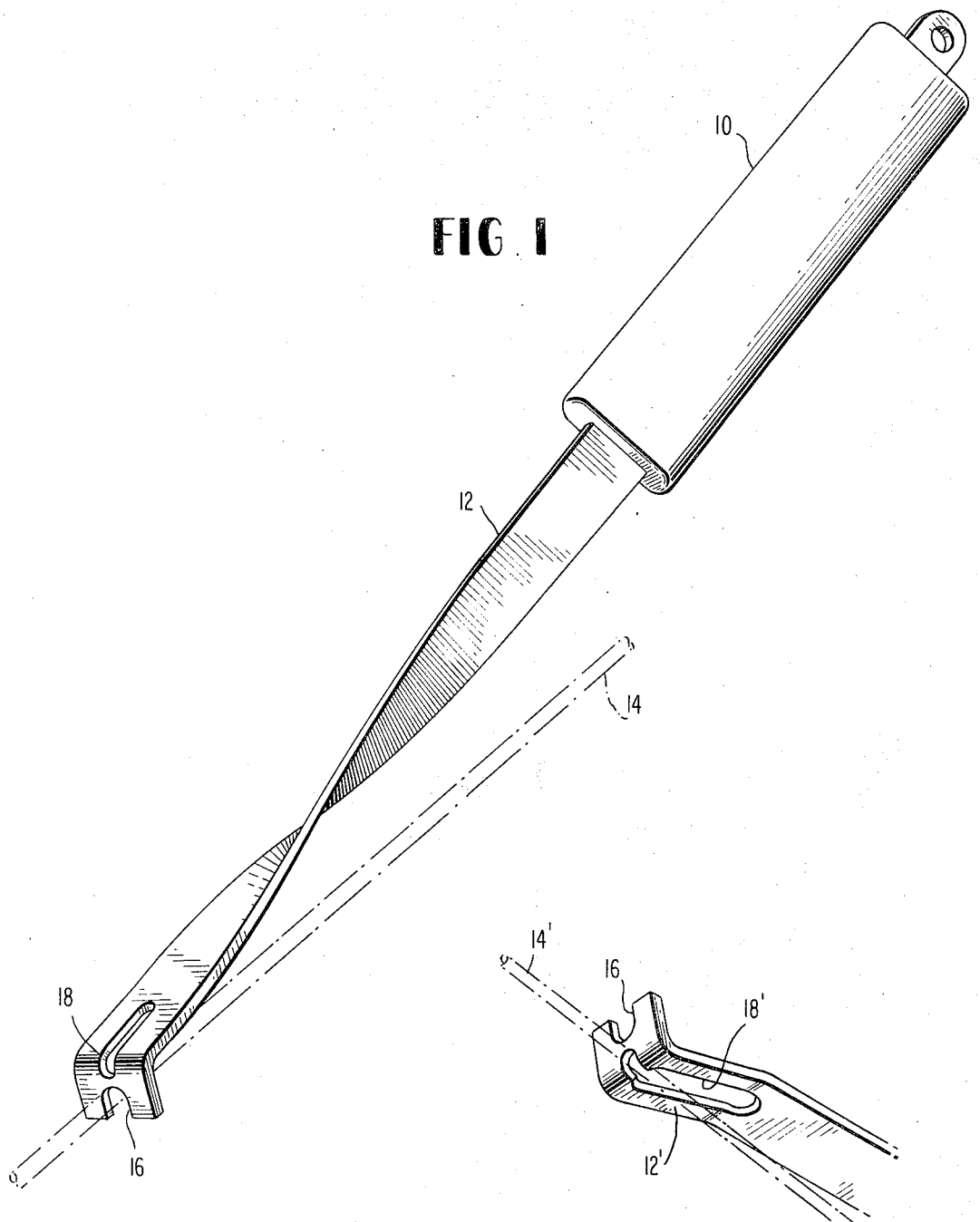
FIG. 1 is a perspective view of one embodiment of the present invention.
FIG. 2 is a perspective view of the end position of a second embodiment of the present invention. In this view, the grill rod and tool are seen from beneath the plane of the grill rods.

FIG. 1 shows the basic design of the present invention. The device shown therein consists of an insulating handle 10, which may be made of plastic, wood, or any other suitable material, and a blade 12 made from flat bar stock of any suitable heat-resistant and rigid material.

The blade 12 is twisted through approximately 90° to facilitate rotation about grill rod 14 to clean the back side thereof. In the shown embodiment, the blade 12 is twisted for the convenience of a right-handed user, but of course it could be twisted in the opposite way for the convenience of a left-handed user.

At the tip of the blade 12, there is an open-faced, U-shaped slot 16 adapted to engage the surface of a grill rod of circular cross section. The slot 16 may be semicircular, or it may have a semicircular base and flat sides leading into the base. In either case, it will envelop approximately 180° of the surface of a grill rod having the same or slightly smaller diameter, and a back and forth motion combined with tool rotation will provide a cleaning action for substantially the entire surface of the grill rod.

Just back of the open-faced, U-shaped slot 16 is a closed, U-shaped slot 18. This slot has a different diameter than the slot 16 to permit the cleaning of grill rods having a different diameter than those cleaned by the slot 16. For instance, one slot may be approximately one-eighth inch in diameter and the other approximately three-sixteenth inch in diameter. In the shown embodiment, the closed slot has a smaller diameter than the open slot, but of course this could be the other way around. The tip of the blade 12 is bent at approximately a right angle to the axis of the major position thereof to permit the engagement of the closed slot 18 with a grill rod in the manner shown in FIG. 2. As shown therein, the line about which this bend is made should be just behind the scraping surface at the front of the closed slot 18. This bend permits the closed slot 18 to be used in cleaning substantially the entire surface of a grill rod by the same kind of back and forth motion combined with tool rotation as is used with the open slot 16. Furthermore, even in a device not having a slot such as slot 18, an approximately right angle bend (normally slightly in excess of 90°) permits the open slot at the top of the blade to engage the surface of the grill rods while the top of the blade is approximately perpendicular to the grill rods but the major portion of the blade and the handle are disposed approximately parallel to the grill rods, facilitating scraping of the grill rods by the blade.

FIG. 2 shows an improved embodiment of the present invention containing two modifications over the embodiment shown in FIG. 1. In looking at FIG. 2, it should be clearly understood that the view is taken from a position beneath the plane of the grill rods.

In FIG. 2, the blade 12' is bent back, or joggled, near the opposite end of the closed slot 18'. This joggle provides additional clearance between the blade of the tool and the grill rod when scraping the back side of grill rods and has been found to significantly improve the function of the device.

In FIG. 2 is will also be seen that the closed slot 18' is not formed from two semicircles of equal diameter and straight lines joining the semicircles, as is the case with the slot 18 in FIG. 1. Rather, the diameter of the closed slot 18' is expanded immediately behind the bend at the front of the slot. This enlargement of the slot diameter provides a lateral clearance for the grill rod 14' which has been found to facilitate movement of the device relative to the grill rods.

CAVEAT

While the present invention has been illustrated by detailed descriptions of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A device for cleaning barbecue grills having grill rods, said device comprising a blade:

1. having a first slot therein adapted to engage one of said grill rods, said first slot being generally U-shaped and located at the tip of said blade;
2. the tip of which is bent at approximately a right angle to the major portion of said blade, thereby permitting said first slot to engage the surface of one of said grill rods while the tip of said blade is approximately perpendicular to said grill rod but the major portion of said blade is disposed approximately parallel to said grill rod, facilitating scraping of said grill rod by said blade; and
3. being twisted to facilitate pivoting said first slot about said grill rods.

2. A device as claimed in claim 1 wherein said blade additionally has a second slot of different diameter than said first slot, said second slot being a closed slot set back from the tip of said blade a distance such that said approximately right-angle bend is just behind the front surface of said second slot.

3. A device as claimed in claim 2 wherein the diameter of said second slot is expanded immediately behind said approximately right-angle bend, thereby providing lateral clearance for said grill rods.

4. A device as claimed in claim 2 wherein said blade is bent back near the rear end of said second slot, thereby providing additional clearance between the blade and said grill rods when the device is in use.

5. A device for cleaning barbecue grills having grill rods, said device comprising a blade:
1. having a first slot therein adapted to engage one of said grill rods, said first slot being generally U-shaped and located at the tip of said blade;
2. the top of which is bent at approximately a right angle to the major portion of said blade, thereby permitting said first slot to engage the surface of one of said grill rods while the tip of said blade is approximately perpendicular to said grill rod but the major portion of said blade is disposed approximately parallel to said grill rod, facilitating scraping of said grill rod by said blade; and
3. having a second slot therein adapted to engage one of said grill rods, said second slot being a closed slot of different diameter than said first slot and being set back from the tip of said blade a distance such that said approximately right-angle bend is just behind the front surface of said second slot.

6. A device as claimed in claim 5 wherein said diameter of said second slot is expanded immediately behind said approximately right-angle bend, thereby providing lateral clearance for said grill rods.

7. A device as claimed in claim 5 wherein said blade is bent back near the rear end of said second slot, thereby providing additional clearance between the blade and said grill rods when the device is in use.

* * * * *